United States Patent
Fu et al.

(10) Patent No.: US 8,687,944 B2
(45) Date of Patent: *Apr. 1, 2014

(54) FRAME INDEXING TECHNIQUE TO IMPROVE PERSONAL VIDEO RECORDING FUNCTIONALITY AND SECURITY OF TRANSMITTED VIDEO

(75) Inventors: Jiang Fu, Irvine, CA (US); Sherman (Xuemin) Chen, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/476,527

(22) Filed: May 21, 2012

(65) Prior Publication Data
US 2012/0321082 A1 Dec. 20, 2012

Related U.S. Application Data

(63) Continuation of application No. 10/635,143, filed on Aug. 6, 2003, now Pat. No. 8,213,769.

(51) Int. Cl.
*H04N 9/80* (2006.01)

(52) U.S. Cl.
USPC .......... 386/258

(58) Field of Classification Search
None
See application file for complete search history.

(56) References Cited

U.S. PATENT DOCUMENTS

| | | | |
|---|---|---|---|
| 5,414,455 A | 5/1995 | Hooper et al. | |
| 6,415,031 B1* | 7/2002 | Colligan et al. | 380/200 |
| 7,010,685 B1* | 3/2006 | Candelore | 713/164 |
| 7,627,752 B2* | 12/2009 | Sakaguchi | 713/160 |
| 7,702,589 B2* | 4/2010 | Candelore | 705/55 |
| 2003/0043847 A1* | 3/2003 | Haddad | 370/473 |
| 2003/0081939 A1* | 5/2003 | Kim et al. | 386/67 |
| 2003/0212822 A1 | 11/2003 | Saha et al. | |
| 2004/0001693 A1* | 1/2004 | Cavallerano et al. | 386/68 |
| 2004/0022313 A1* | 2/2004 | Kim | 375/240 |
| 2004/0049691 A1* | 3/2004 | Candelore et al. | 713/193 |
| 2006/0165232 A1* | 7/2006 | Burazerovic et al. | 380/37 |

OTHER PUBLICATIONS

ITU-T Rec. H.222.0 (2000) Amd. 3 (2003), International Organisation for Standardisation Organisation Internationale de Normalisation, ISO/IEC JTCI/WGII, Coding of Moving Pictures and Audio, ISO/IEC JTC1/SC29/WG11 N5605, pp. 1-13.

International Standard, ISO/IEC 13818-1 First edition 1996, Information Technology—Generic Coding of Moving Pictures and Associated Audio Information: Systems, pp. 1-120.

Draft ITU-T Rec. H. 264 (2002E), Joint Video Team (JVT) of ISO/IEC MPEG & ITU-T VCEG (ISO/IEC JFC1/SC29/WG11 and ITU-T SG16 Q.6), Draft Text of Final Draft International Standard (FDIS) of Joint Video Specification (ITU-R Rec. H. 264 | ISO/IEC 14496-10AVC), 7th Meeting: Pattaya, Thailand, Mar. 2003, pp. 1-250.

Comments and clarifications to JVT text JVT-F100, Joint Video Team (JVT) of ISO/IEC MPEG & ITU-T VCEG. Document: JVT-G039, Filename: JVT-G039.doc (obtained online).

* cited by examiner

*Primary Examiner* — Christopher S Kelley
*Assistant Examiner* — Christopher Findley
(74) *Attorney, Agent, or Firm* — Thomas | Horstemeyer, LLP

(57) ABSTRACT

Systems and methods of efficiently indexing a digitized video stream are presented. In one embodiment, the method comprises receiving a coded video stream containing non-scrambled frame location indicators and scrambled video data, filtering the non-scrambled frame location indicators, and generating a database used for indexing frames. In one embodiment, the apparatus comprises a processor such as a hardware and/or software capable of generating a database used for improving video playback functionality by way of filtering non-scrambled indicators that define the start of frames in a digitized video stream.

20 Claims, 11 Drawing Sheets

FRAME INDEXING TECHNIQUE TO IMPROVE PERSONAL VIDEO RECORDING FUNCTIONALITY AND SECURITY OF TRANSMITTED VIDEO

CROSS-REFERENCE TO RELATED APPLICATION

This application is a continuation of U.S. patent application Ser. No. 10/635,143, filed Aug. 6, 2003, now U.S. Pat. No. 8,213,769, entitled "FRAME INDEXING TECHNIQUE TO IMPROVE PERSONAL VIDEO RECORDING FUNCTIONALITY AND SECURITY OF TRANSMITTED VIDEO", the entirety of which is hereby incorporated herein by reference.

BACKGROUND OF THE INVENTION

An innovative class of devices known as personal video recorders, or PVRs, has emerged recently. PVRs utilize digitized video as a means to conveniently manipulate the video data by way of its hardware and software. The hardware often comprises a storage device such as a hard drive. PVRs allow a user to employ one or more indexing techniques or trick modes that include time shifting, pausing and fast forwarding video to provide a more desirable viewing experience for the user. In as much as they are a convenient tool for the user, there are a number of disadvantages to using PVRs that relate to the way video is currently indexed.

One drawback of existing PVRs relates to its inability to securely store the scrambled video when personal video recording functions are performed. Video is often scrambled by a publisher of video material in order to prevent unauthorized access. For any scrambled video, current PVR methods require an unscrambling of the entire video in order to extract frame indexing information. As a consequence, the unscrambled video becomes vulnerable to unauthorized piracy.

Another drawback of today's PVRs relate to the inefficiencies related to obtaining indexing information of any scrambled video. The entire video must be descrambled using a variable length decoding engine in order to access frame indexing information. Unfortunately, this requires significant processing power and time. The drawback may significantly affect a user's ability to perform one or more trick modes within a reasonable amount of time. As a result, the benefits of PVR functionality is reduced.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method, system and/or apparatus to efficiently index portions of video in a coded video stream. Non-scrambled indicators or markers are employed in the video stream to indicate the beginning of each frame or picture within the video stream.

In one embodiment, a method of indexing video data comprises receiving a coded video stream containing non-scrambled frame location indicators. The video data may be scrambled to prevent unauthorized use by others. The non-scrambled frame location indicators are used to generate a database that is stored in a memory such as a hard disk drive. In one embodiment, the indicators comprise access unit delimiters conforming to advanced video coding (AVC), H.26L, H.264, JVT, or MPEG-4 standards. In one embodiment, the (AVC), H.26L, H.264, JVT, or MPEG-4 standards are used with the MPEG-2 standard. The use of the indicators allow improvements in personal video recorder functionality, allowing faster processing of requests made by a user, to implement PVR functions. In one embodiment, the coded video stream comprises picture type, timing, packet position, and length of frame information.

In one embodiment, an apparatus for generating a database used for improving video playback functionality comprises a means for filtering non-scrambled indicators that define the start of frames in a digitized video stream. In one embodiment, the apparatus for generating the database used for improving video playback functionality comprises a processor. The processor comprises hardware and/or software. The apparatus further comprises a means for logically storing frame position information of said indicators into a memory to create the database. The apparatus further comprises a means for recalling the frame position from the memory. The apparatus further comprises a means for initiating video playback at a desired frame position. In one embodiment, the indicators comprise access unit delimiters used in (AVC), H.26L, H.264, JVT, or MPEG-4 standards. In one embodiment, the memory comprises a hard disk drive. In one embodiment, a system for improving video playback comprises a means for creating a database containing location of frames within a video stream.

These and other advantages, aspects, and novel features of the present invention, as well as details of illustrated embodiments, thereof, will be more fully understood from the following description and drawings.

DETAILED DESCRIPTION

Figure 1:
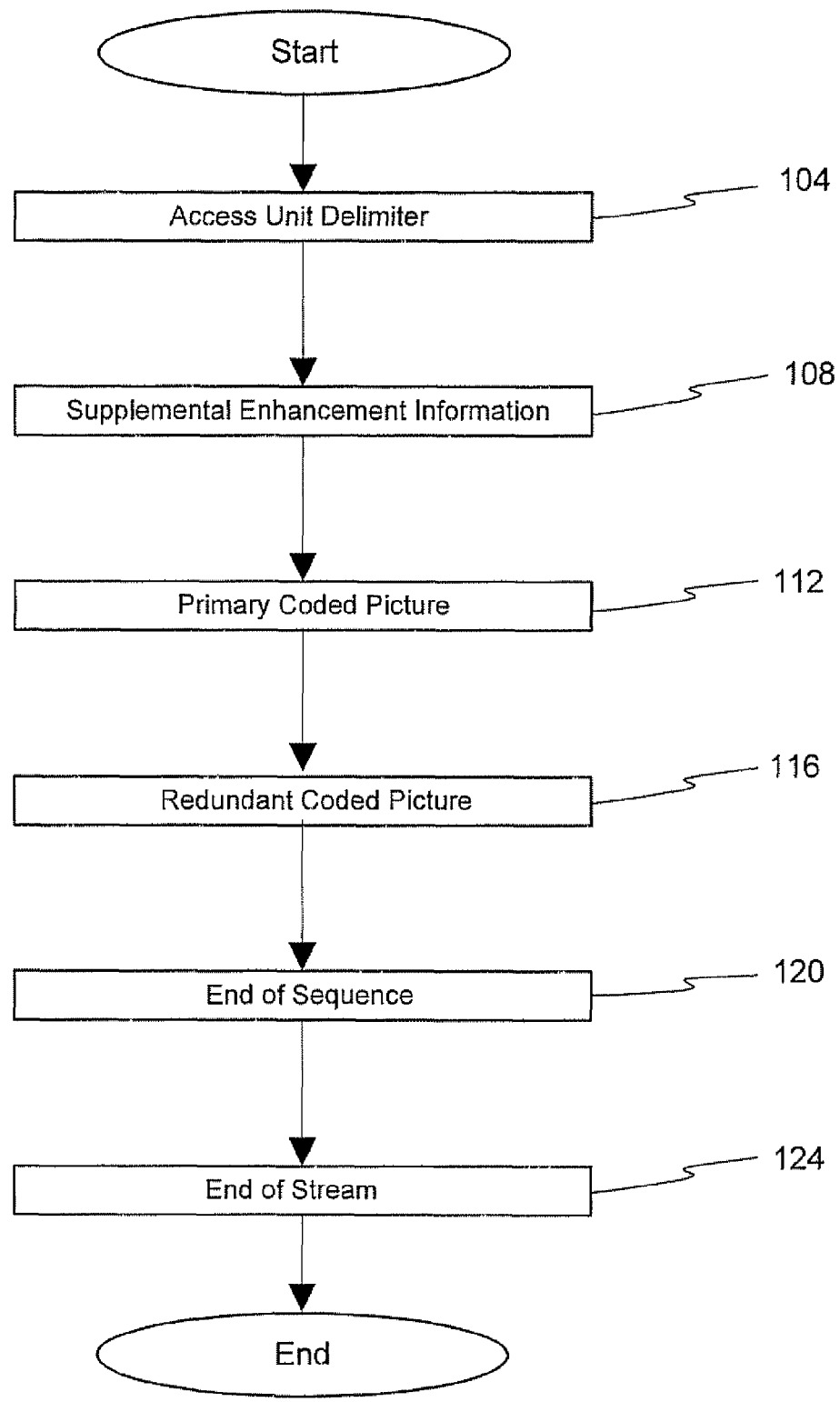
FIG. 1 is a relational block diagram of a typical structure of an access unit in accordance with an embodiment of the invention.

Aspects of the present invention may be found in a system and method to efficiently index frames within a digitized video stream allowing enhanced playback of recorded video by implementing an indexing system that utilizes one or more indicators (or markers) that reference the location of frames (or pictures) within a digitized video stream. In one embodiment, the indicators reference the start of each video frame of the digitized video stream. The indexing system utilizes an indexing engine that generates an indexing table (or database) based on the location of the indicators within the digitized video stream. The indexing engine comprises a processor that filters and extracts the one or more indicators or markers. The indicators or markers are transmitted to a viewer in a non-scrambled format in order to improve processing speed of the processor. In one embodiment, the indicators may comprise non-scrambled data in the form of one or more access unit delimiters used in Advanced Video Coding (AVC), H.26L, H.264, JVT, or MPEG-4 standards. In one embodiment, the processor comprises an indexing engine for use with Advanced Video Coding (AVC), H.26L, H.264, JVT, or MPEG-4 coding standards. In one embodiment, one or more access unit delimiters, as specified in the AVC standard, is used to indicate the beginning of each frame of the digitized video stream. As described herein, the processor that is used to identify and generate the indexing table from the digitized video stream is termed an "access unit delimiter indexing engine". The access unit delimiter indexing engine may be equipped with a memory device such as an exemplary hard disk drive that digitally records live TV programs and stores the indexing table. In this manner, the indexing table may be used by a viewer to quickly identify locations within a digitized video stream in order to playback or view certain desirable frames of the digitized video stream. The processor or access unit delimiter indexing engine may comprise hardware and/or software capable of generating the indexing table or database.

Aspects of the present invention may be implemented within a personal video recorder (PVR) to provide improved speed in performing PVR functionalities. These PVR functionalities include various special access or playback modes. For example, a viewer may utilize modes such as frame advance, slow motion, smooth fast forward, pause/still, fast forward, slow forward, rewind, slow reverse, and skip, etc., to efficiently and conveniently view one or more frames of the digitized video stream.

Aspects of the present invention allow for the prevention of unauthorized use of video data by way of scrambling the video data prior to incorporation into a transmitted digitized video stream. By selectively scrambling the video data and not scrambling the indicators or markers that designate the start of each frame, the previously described improvement in PVR functionalities may be accomplished without sacrificing security. Of course, a video content provider may optionally transmit the video data without scrambling the video content. However, aspects of the present invention allow a video content provider to selectively charge a consumer or user when video content is transmitted to the consumer or the user in an unscrambled format.

FIG. 1 is a relational block diagram of a typical structure of a subset of coded video data in accordance with an embodiment of the invention. The coded video data may comprise a number of data packets that form an access unit. An access unit as defined in this document and as implemented, for example, in the Advanced Video Coding (AVC) standard, comprises a set of network abstraction layer (NAL) units in a specified format to provide one decoded frame or picture. The structural format of an access unit may be described in FIG. 1. The first NAL unit comprises an indicator that indicates the start of a new frame or picture. In one embodiment, the indicator comprises an access unit delimiter 104. Thereafter, one or more supplemental enhancement information data packets 108 that may be configured to provide packet position, timing, and length of frame information are transmitted. Next, a set of NAL units representing the transmitted frame or picture is transmitted. These NAL units may comprise a primary coded picture 112, for example, as specified in the AVC standard. The primary coded picture 112 may be followed by one or more redundant sets of NAL units used in recovering lost or corrupted video data provided by the primary coded picture 112. These redundant NAL units may comprise a redundant coded picture 116, as specified in the AVC standard. Thereafter, an exemplary end of sequence NAL unit 120 may be present to indicate the last frame or picture of a coded video sequence. The end of sequence NAL unit 120 may be followed by an end of stream NAL unit 124 to indicate that the entire stream is ending. It is contemplated that this is but one embodiment of an exemplary coding standard incorporating an indicator such as an access unit delimiter, used to indicate the start of a new frame or picture in a coded video stream.

Figure 2:
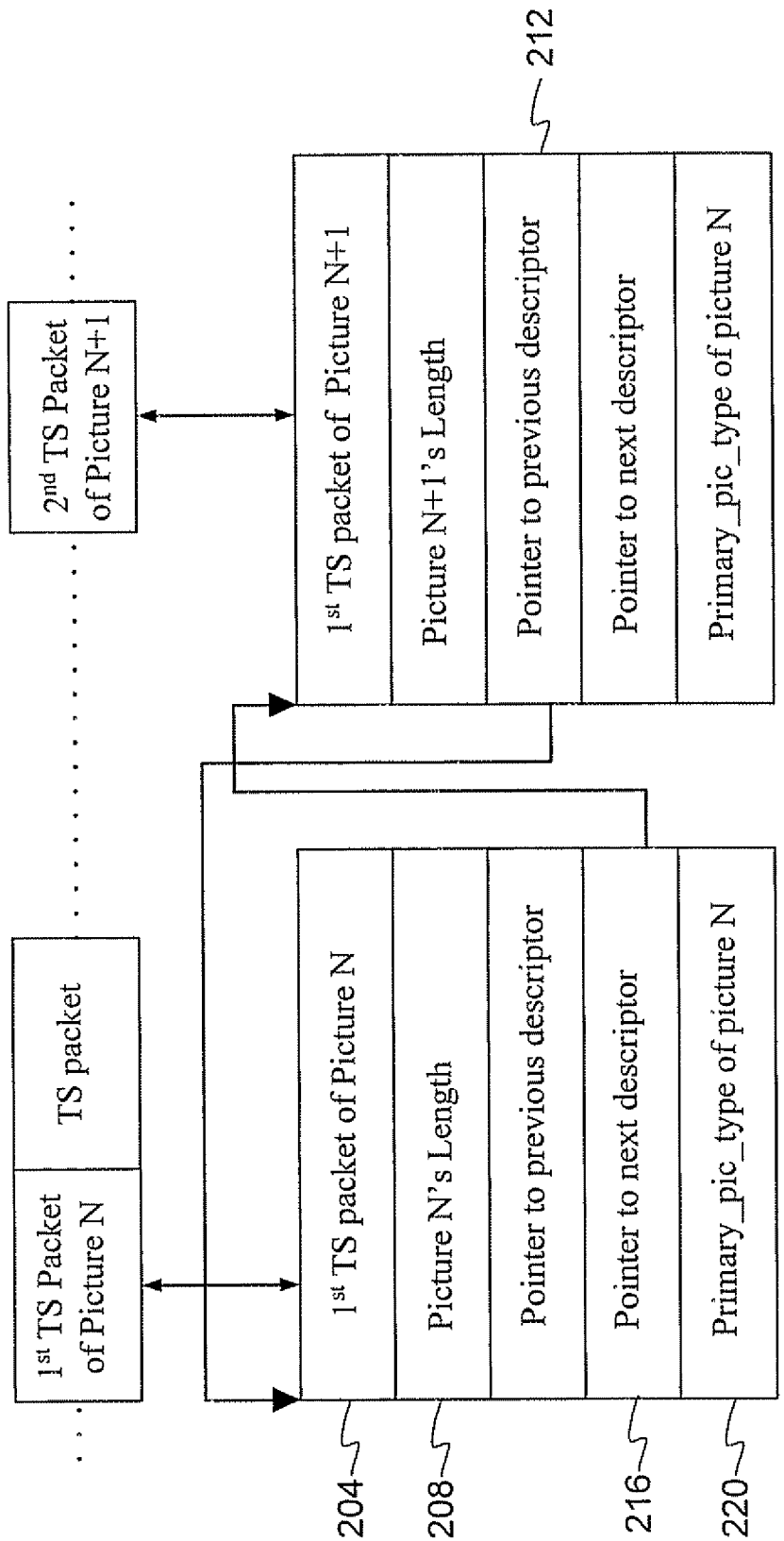
FIG. 2 is a block diagram illustrating the structure of an indexing table in accordance with an embodiment of the invention.

FIG. 2 is a block diagram illustrating the structure of an indexing table in accordance with an embodiment of the invention. The indexing table provides a mapping of the positions of one or more indicators such as one or more access unit delimiters interspersed within coded video data. By storing a database of descriptors into locations in memory describing the positional information of frames within a coded video data stream, a start of a particular frame within the video coded data may be quickly and efficiently determined. As a consequence, the video may be viewed starting from the selected frame. The memory may comprise an exemplary hard disk drive or other storage device capable of storing the coded video data and/or indexing table. FIG. 2 illustrates a memory mapping of exemplary transport stream (TS) layer packets as implemented by way of an exemplary MPEG 2 standard. As illustrated, the memory may store a first TS packet 204 designating the first packet of each picture or frame, length of the Nth picture or frame 208, a reference pointer to a previous descriptor 212, a reference pointer to a next descriptor 216, and picture type information 220.

Figure 3:
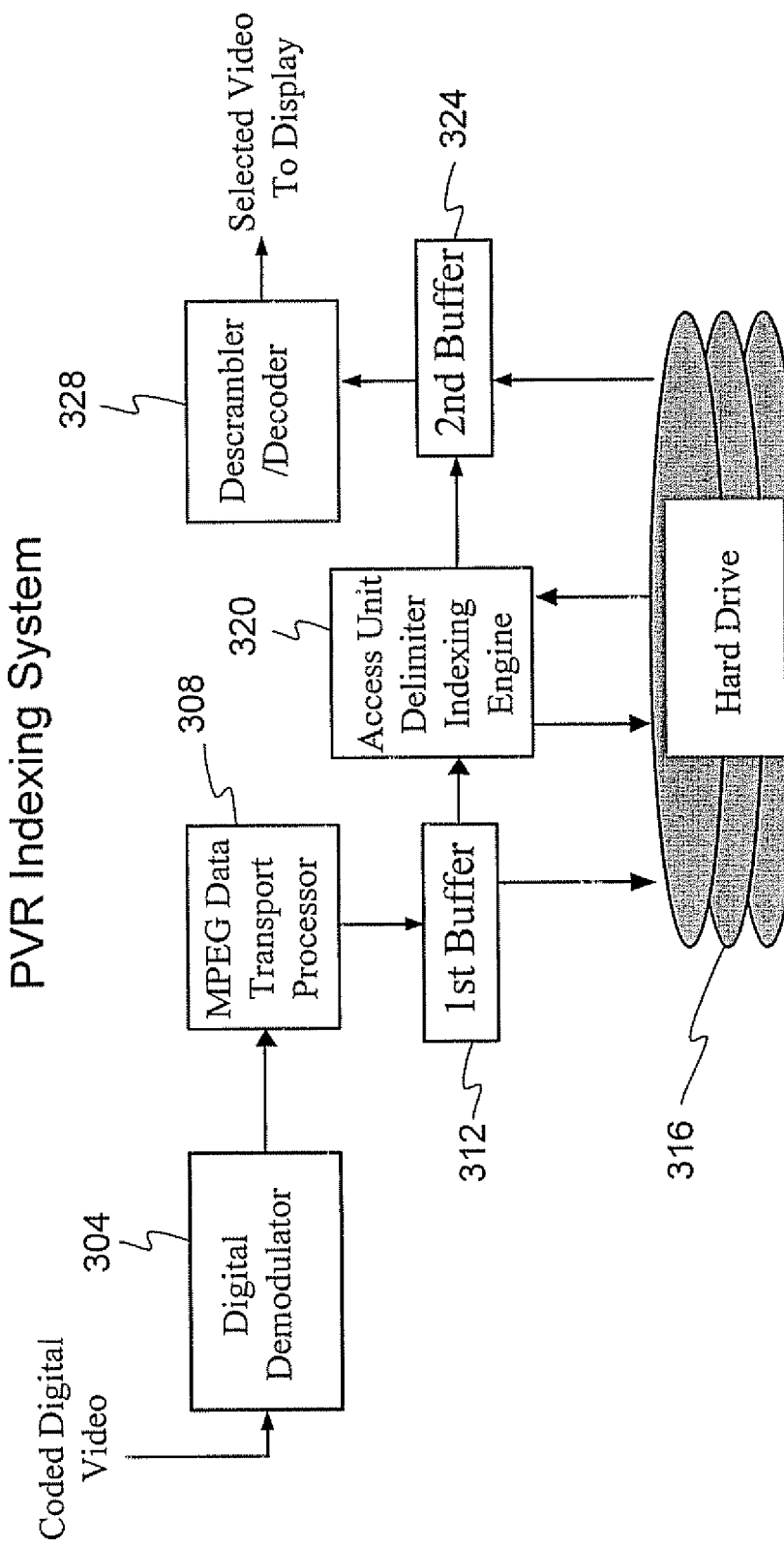
FIG. 3 is a relational block diagram of a personal video recorder (PVR) indexing system for implementing a personal video recording indexing process in accordance with an embodiment of the invention.

FIG. 3 is a relational block diagram of a personal video recorder (PVR) indexing system for implementing a personal video recording indexing process in accordance with an embodiment of the invention. The PVR indexing system comprises a digital demodulator 304, an MPEG data transport processor 308, a first data buffer 312, a hard disk drive 316, an access unit delimiter indexing engine 320, a second data buffer 324, and a descrambler/decoder 328. As illustrated in FIG. 3, a coded digital video stream is input in the digital demodulator 304. The digital video stream may be received from a connection provided by a carrier. One or more selectable video programs or channels will be contained in the coded digital video stream. The digital demodulator 304 functions to demodulate a received coded digital video stream to an appropriate baseband coded video data. Thereafter, the baseband coded video signal is received by a processor such as the MPEG data transport processor 308. The MPEG data transport processor 308 selects a particular program or channel by filtering the coded digital video data and subsequently decrypting the filtered data at a layer such as the transport layer (TS) of the coded digital video. Next, the MPEG data transport processor 308 may reconfigure the filtered data at the transport layer and subsequently store the reconfigured data in the first data buffer 312. The first data buffer 312 facilitates recording of the selected data into the hard disk drive 316.

While recording, the access unit delimiter indexing engine 320 may optionally filter the coded digital video stream data in search of one or more indicators that indicate the start of one or more frames or pictures. These indicators may be comprised of the previously mentioned access unit delimiters. The access unit delimiter indexing engine 320 filters the one or more access unit delimiters in order to implement an indexing table stored in memory, such as a hard disk drive 316. The access unit delimiters contain non-scrambled data allowing the access unit delimiter indexing engine 320 to quickly process and configure the indexing tables. The access unit delimiter indexing engine 320 interfaces with the hard disk drive 316 to store data, such as frame position data or other descriptors, obtained from the one or more indicators (i.e., access unit delimiters) interspersed within the coded digital video data. By way of generating the indexing table, the access unit delimiter indexing engine improves video playback functionality. The access unit delimiter indexing engine 320 logically stores frame position information of said one or more indicators into the exemplary hard disk drive 316. In addition, the access unit delimiter indexing engine 320 recalls frame position information from the hard disk drive 316 in order to initiate video playback at a particular frame position. The picture or frame position data is mapped into the hard disk drive 316 by control provided by the access unit delimiter indexing engine 320.

The second buffer 324 facilitates delivery of coded video data into the descrambler/decoder 328. Any timing changes resulting from control provided by the access unit delimiter indexing engine 320 are obviated by the second buffer 324. The selected program or channel is subsequently descrambled/decoded by the descrambler/decoder 328. Thereafter, the program or channel is displayed by a monitor or television or any appliance capable of visually providing the selected video to a viewer. It is contemplated that the elements 304, 308, 312, 316, 320, 324, 328 described in FIG. 3 may be incorporated into a set-top box used to interface coded digital video provided by the carrier to a display such as an exemplary television.

Figure 4:
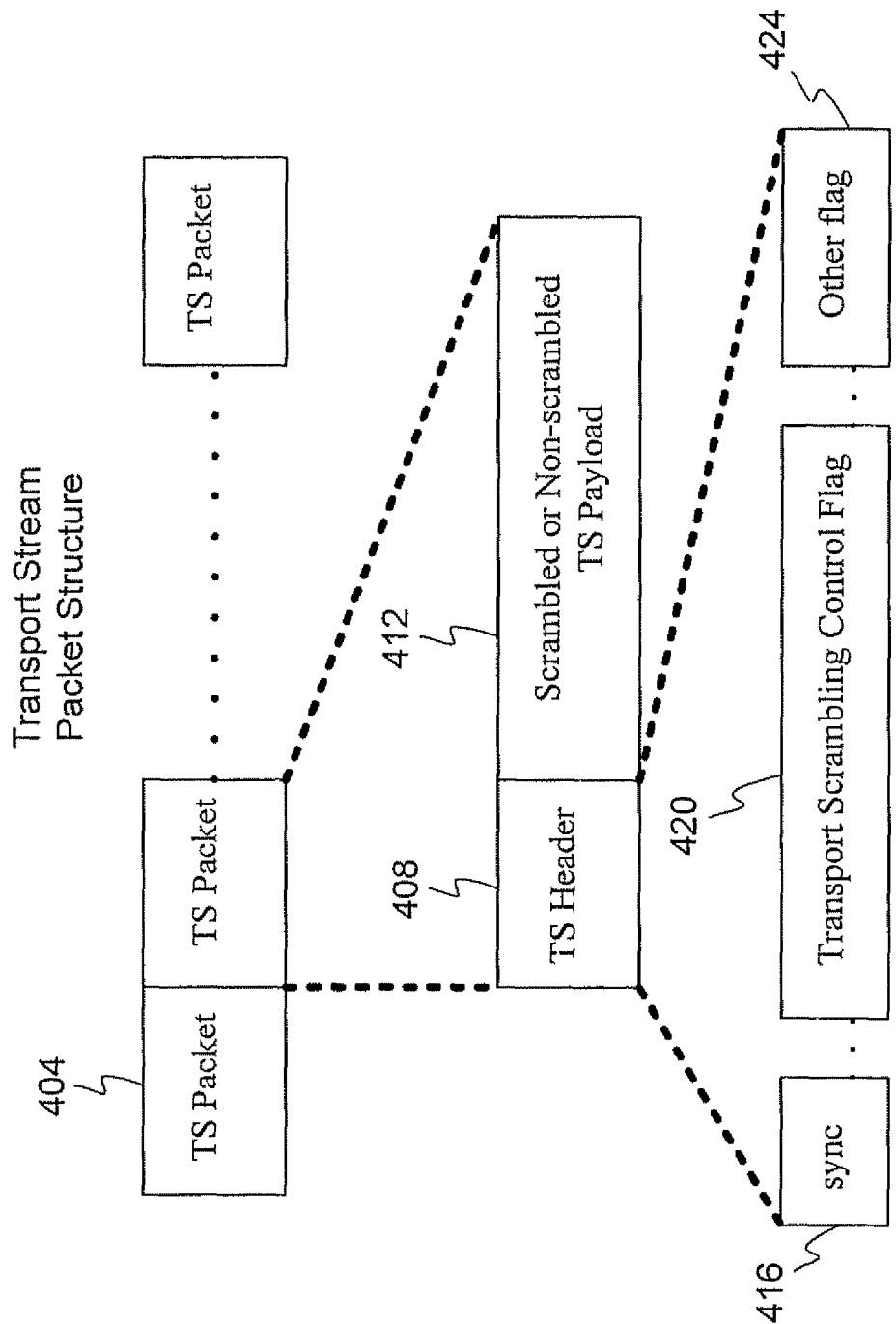
FIG. 4 is a relational block diagram illustrating a typical structure of a transport stream (TS) packet in accordance with an embodiment of the invention.

FIG. 4 is a relational block diagram illustrating a typical structure of a packet stream 404 used to encode a digitized video data. In one embodiment, the packet stream 404 comprises exemplary MPEG2 transport stream (TS) packets 404. Each packet contains a transport packet header 408 and a payload 412. The payload 412 may comprise scrambled or non-scrambled video data. The transport stream header 408 may comprise a sync packet 416 and one or more flags 420, 424. The sync packet 416 may comprise synchronization byte used to synchronize a device to the digitized video data. The transport scrambling control flag 420 indicates whether the contents of the associated payload 412 is scrambled or not. For example, if transport scrambling control flag 420 is set to zero, the payload 412 contains data that is not scrambled. Otherwise, the payload 412 contains data that is scrambled (i.e., when transport scrambling control flag is set to a value of 1). It is contemplated that the video content provided by a content provider or carrier may employ one or more techniques for scrambling the digitized video data.

Figure 5:
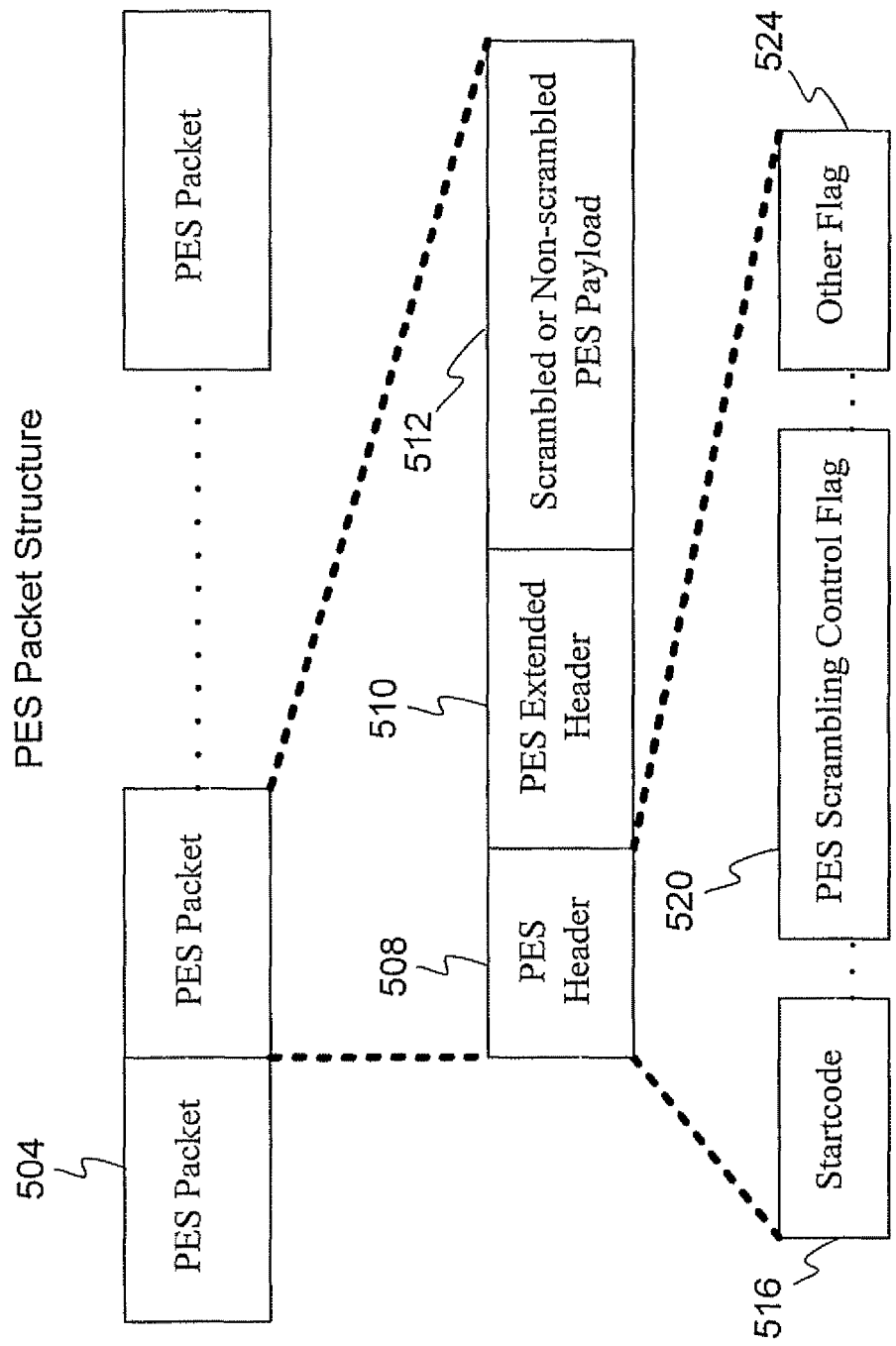
FIG. 5 is a relational block diagram illustrating a typical structure of a packet elementary stream (PES) packet in accordance with an embodiment of the invention.

FIG. 5 is a relational block diagram illustrating a typical structure of a packet stream 504 used to encode a digitized video data. In one embodiment, the packet stream 504 comprises exemplary MPEG2 packetized elementary stream (PES) packets 504. Each packet contains a PES packet header 508, a PES extended header 510, and a payload 512. The payload 512 may comprise scrambled or non-scrambled video data. The PES header 508 may comprise a startcode 516 and one or more flags 520, 524. The PES scrambling control flag 520 indicates whether the contents of the associated payload 512 is scrambled or not. The startcode 516 may comprise bits representing the beginning of a stream of PES packets and/or stream identifying information. For example, if transport scrambling control flag 520 is set to zero, the payload 512 contains data that is non-scrambled. Otherwise, the payload 512 is scrambled (i.e., when transport scrambling control flag is set to a value of 1). It is contemplated that the video content provided by a content provider or carrier may employ one or more techniques for scrambling the digitized video data.

Figure 6:
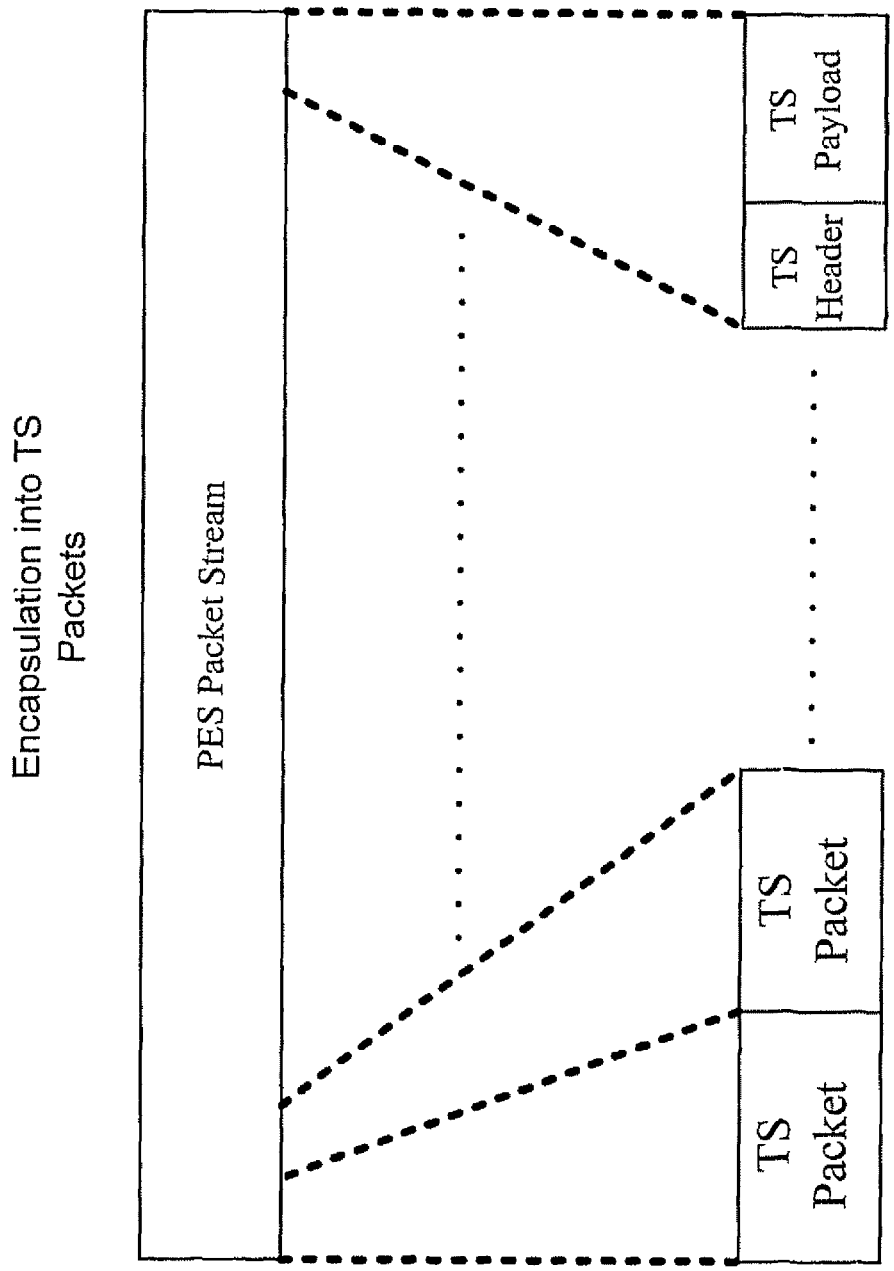
FIG. 6 is a relational block diagram illustrating partitioning of PES packets into TS packets in accordance with an embodiment of the invention.

FIG. 6 is a relational block diagram illustrating partitioning of PES packets into TS packets in accordance with an embodiment of the invention. The diagram illustrates the relationship between TS and PES packets in an MPEG2 implementation. As shown, PES packets are partitioned into one or more TS packets of fixed length, where each TS packet is composed of a header and a payload. When transport packets are formed from a PES stream, the PES header is always placed at the beginning of a transport packet payload, immediately following the transport packet header. The contents of a PES packet is used to fill the payloads of one or more transport packets until the remaining payload of the PES packet is encapsulated to create the last transport packets. The final transport packet is filled to a fixed length by using stuffing byes (i.e., with bytes=0xFF (all ones)).

FIGS. 4-6 illustrate different techniques of transmitting data. FIG. 4 illustrates a technique of transmitting data in which scrambling control of data is deployed at the transport stream layer of video data. In contrast, FIG. 5 illustrates a technique of transmitting data in which scrambling control of data is deployed at the packetized elementary layer of video data. In either technique, scrambling or non-scrambling of payload data may be accomplished over one or more different protocol layers. If scrambling control is deployed over one or more protocol layers as illustrated by the embodiments of FIGS. 4 and 5, it is contemplated that only one of the protocol layers is selected to provide the scrambling/non-scrambling control.

It is contemplated that the aforementioned payload scrambling control techniques may be applied to other coding standards. In order to implement the PVR functionality described earlier, the one or more indicators may be transmitted in a non-scrambled format while the video content is transmitted in a scrambled format. Of course, the scrambling/non-scrambling control may be effectuated by a carrier or a video content provider. In one embodiment, the one or more indicators may comprise one or more access unit delimiters utilized in the Advanced Video Coding (AVC), H.26L, H.264, JVT, or MPEG-4 coding standards. By transmitting the indicators within packets that are non-scrambled, the access unit delimiter indexing engine previously described may more efficiently process and map frame position information into memory. In addition to improving processing speed, the video content may be optionally scrambled to provide security against unauthorized access.

The following FIGS. 7-11 provide embodiments of scrambling of video data at two exemplary data layers in a video transmission. The exemplary data layers comprise transport stream (TS) and a packetized elementary stream (PES) layers. As illustrated, a video content provided may selectively deploy scrambling at either one of the two layers to be described.

Figure 7:
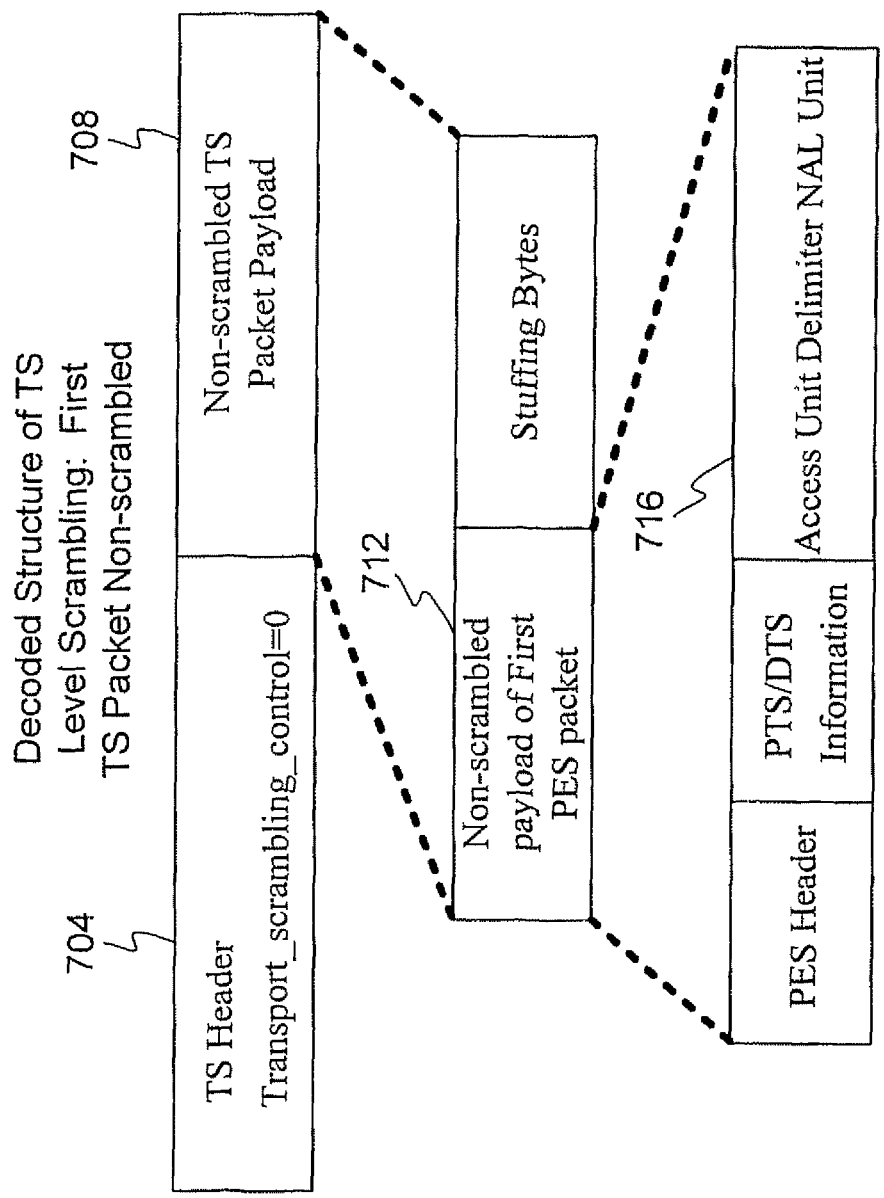
FIG. 7 is a relational block diagram illustrating a decoded structure of TS layer scrambling in which the first TS packet is non-scrambled in accordance with an embodiment of the invention.

FIG. 7 is a relational block diagram illustrating a decoded structure of TS layer scrambling in which the first TS packet is non-scrambled in accordance with an embodiment of the invention. The first TS packet incorporates an indicator that indicates the beginning of a frame or picture in a coded digital video data stream. The diagram illustrates scrambling control that is employed at the transport stream layer of an exemplary MPEG-2 type of video transmission. As illustrated, an indicator, such as an exemplary access unit delimiter 716, is incorporated into the non-scrambled payload of the first PES packet 712. Further, the non-scrambled payload of the first PES packet 712 is encapsulated into a non-scrambled TS packet payload 708. An associated TS header 704 incorporates a transport scrambling control flag. In this embodiment, the transport scrambling control flag is set to a value of zero.

Figure 8:
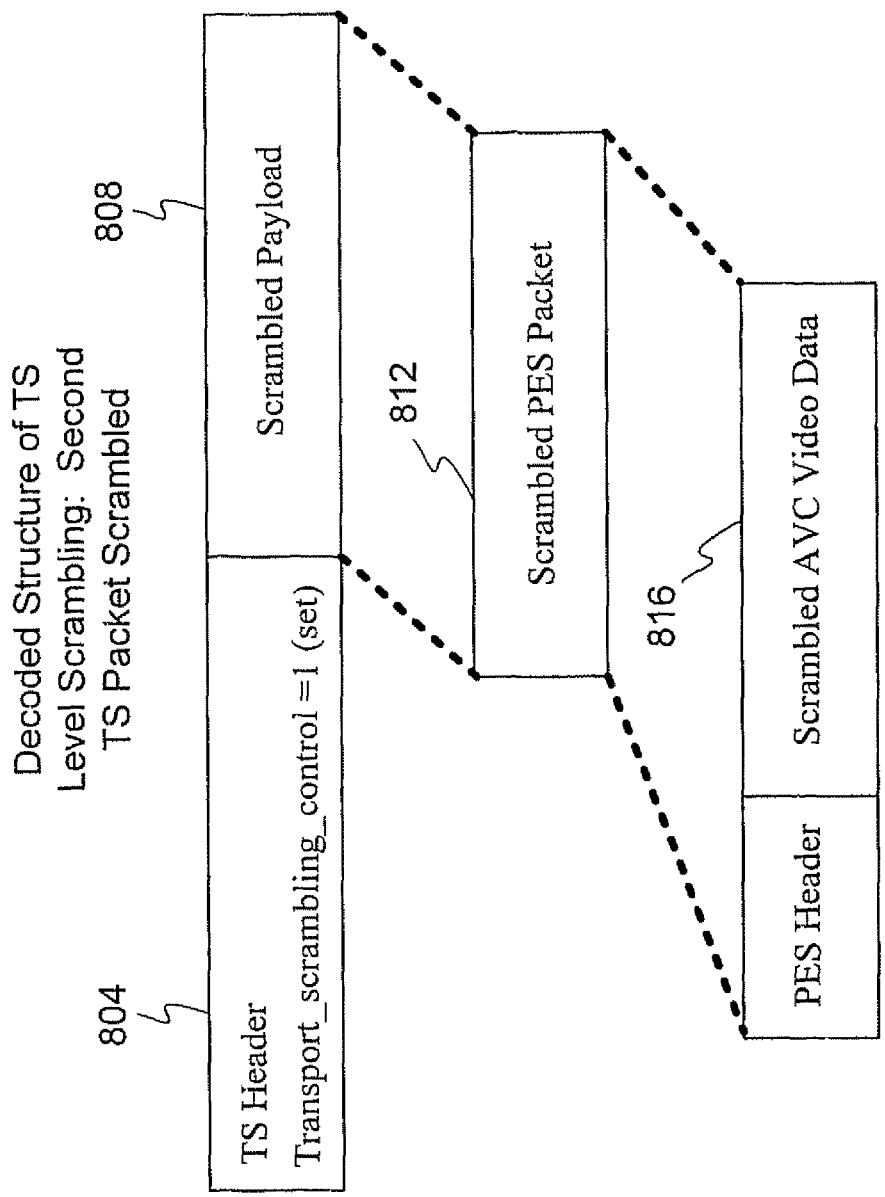
FIG. 8 is a relational block diagram illustrating a decoded structure of TS layer scrambling in which the second TS packet is scrambled in accordance with an embodiment of the invention.

FIG. 8 is a relational block diagram illustrating a decoded structure of TS layer scrambling in which the second TS packet is scrambled in accordance with an embodiment of the invention. The second TS packet incorporates video content data as a scrambled payload 808. The diagram illustrates scrambling control that is employed at the transport stream layer of an exemplary MPEG-2 type of video transmission. As illustrated, video data is incorporated into the PES layer as scrambled AVC video data 816. The scrambled PES packet 812 is incorporated as scrambled payload into an associated TS packet 808. An associated TS header 804 incorporates a transport scrambling control flag. In this embodiment, the transport scrambling control flag is set to a value of one.

Figure 9:
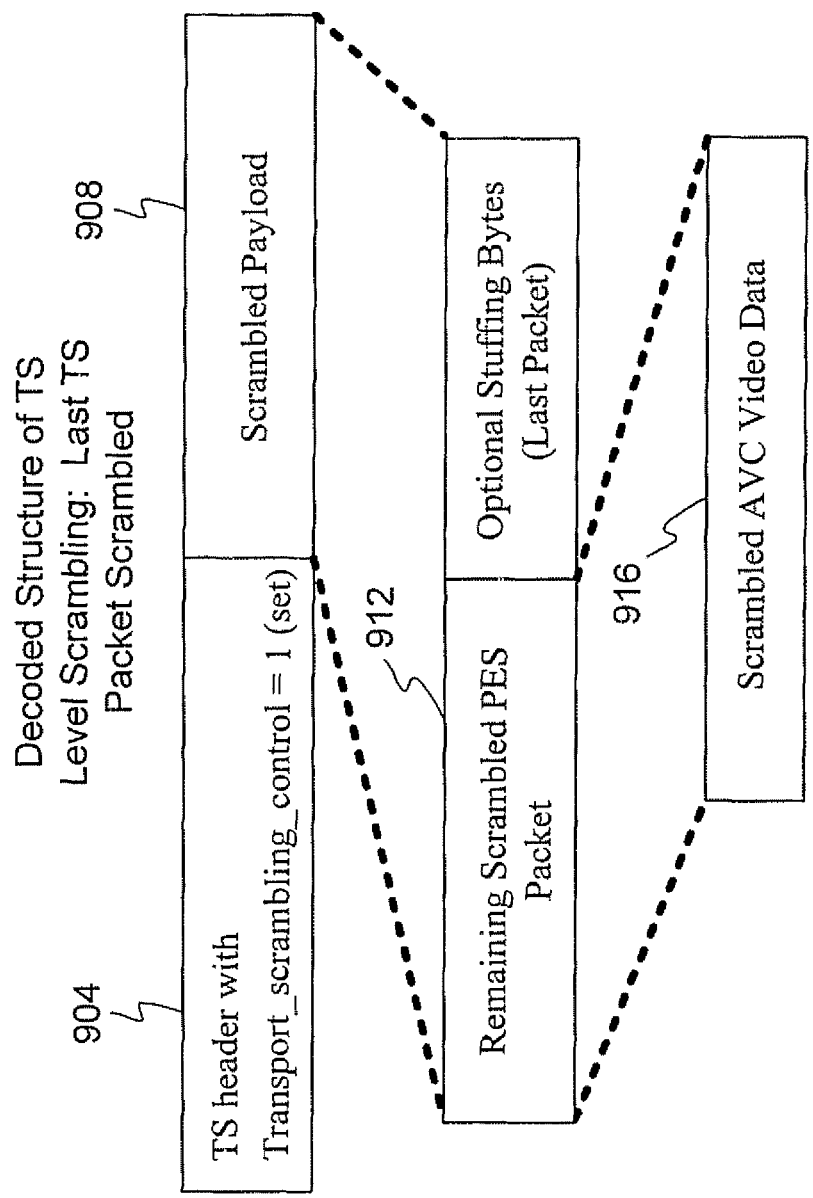
FIG. 9 is a relational block diagram illustrating a decoded structure of TS layer scrambling in which the last TS packet is scrambled in accordance with an embodiment of the invention.

FIG. 9 is a relational block diagram illustrating a decoded structure of TS layer scrambling in which the last TS packet is scrambled in accordance with an embodiment of the invention. The remaining TS packet incorporates remaining video data such as video content data as a scrambled payload 908. The diagram illustrates scrambling control that is employed at the transport stream layer of an exemplary MPEG-2 type of video transmission. As illustrated, video data is incorporated into the PES layer as scrambled AVC video data 916. Optional stuffing bytes may be appended as shown. The scrambled PES packet 912 is incorporated as scrambled payload into an associated TS packet 908. An associated TS header 904 incorporates a transport scrambling control flag. In this embodiment, the transport scrambling control flag is set to a value of one since the transmitted video content is scrambled.

In the embodiments of FIGS. 8-9, the scrambled AVC video data may be optionally transmitted as non-scrambled AVC data. Of course, a content provider or carrier or appropriate party may dictate whether the transmitted video data is to be scrambled. The decision to scramble or not may be dependent on one or more business factors.

Figure 10:
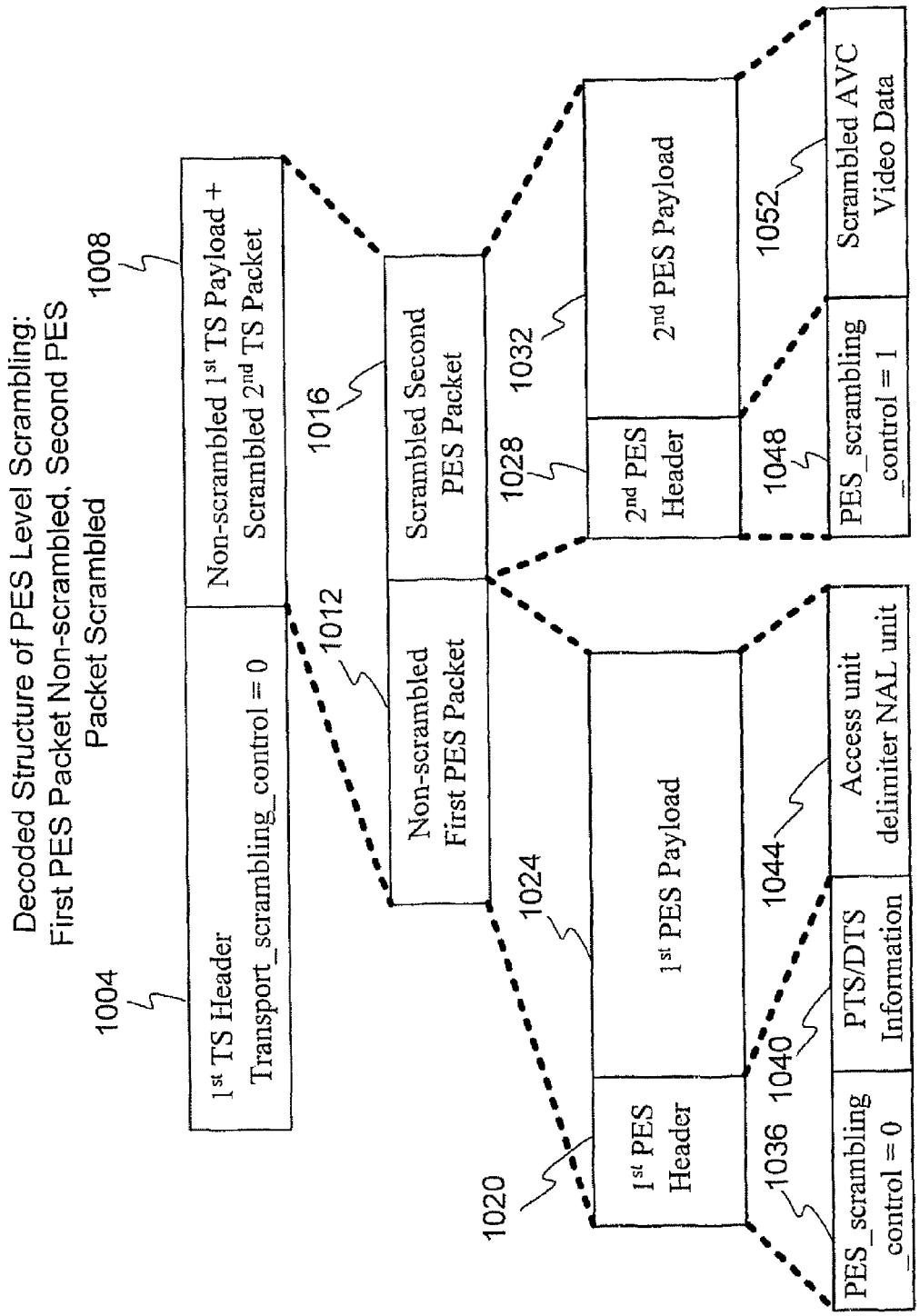
FIG. 10 is a relational block diagram illustrating a decoded structure of PES layer scrambling in which the first PES packet is non-scrambled and the second PES packet is scrambled in accordance with an embodiment of the invention.

FIG. 10 is a relational block diagram illustrating a decoded structure of PES layer scrambling in which the first PES packet is non-scrambled while the second PES packet is scrambled in accordance with an embodiment of the invention. As illustrated in the embodiment, the first PES packet comprises a first PES header 1020 and first PES payload 1024. The first PES header 1020 comprises a PES scrambling control flag 1036 and PTS/DTS information 1040. The presentation time stamp (PTS) and the decoding time stamp (DTS) represent timing information required for an access unit to be properly decoded by a decoder. The first PES payload 1024 may comprise a frame position indicator such as an access unit delimiter NAL unit 1044 used in MPEG-4. The first PES packet 1012 may be incorporated into a first TS payload 1008 of the first TS layer packet. The first TS layer packet may comprise an associated TS header 1004 having a transport scrambling control flag set equal to zero. As shown, the non-scrambled first TS packet payload and the second TS layer packet is represented by reference number 1008. The second PES packet 1016 is comprised of a second PES header 1028 and a second PES payload 1032. In this embodiment, the second PES packet 1016 contains scrambled AVC video data. The second PES header 1028 comprises a PES scrambling control flag 1048 while the second PES payload comprises a scrambled AVC video data 1052. The PES scrambling control flag 1048 may be set equal to a value equal to one, for example, to indicate that the associated payload contains scrambled data.

Figure 11:
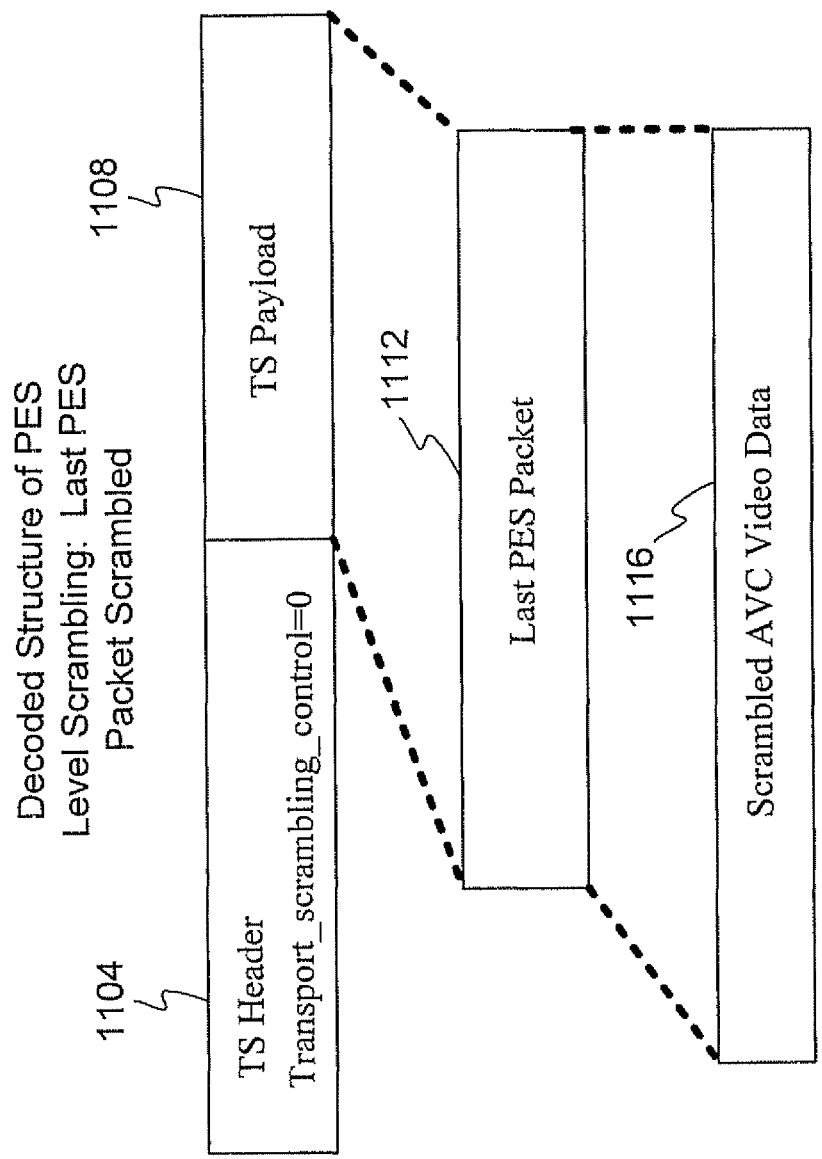
FIG. 11 is a relational block diagram illustrating a decoded structure of PES layer scrambling in which the last PES packet is scrambled in accordance with an embodiment of the invention.

FIG. 11 is a relational block diagram illustrating a decoded structure of PES layer scrambling in which a last PES packet 1112 is scrambled in accordance with an embodiment of the invention. As illustrated, a remaining scrambled AVC video data 1116 is incorporated into the last PES packet 1112. Although not shown, the last PES packet 1112 has associated PES header containing a PES scrambling control flag that is appropriately set or activated (set equal to 1). The last PES packet 1112 is incorporated into a TS payload 1108 of a transport layer packet and its associated TS header 1104 is shown containing a transport scrambling control flag set equal to zero (indicating that the payload is not scrambled).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

At least the following is claimed:

1. A method of indexing video data within a video stream comprising:
   receiving the video stream, the video stream comprising network abstraction layer (NAL) units, the NAL units including a non-scrambled access unit delimiter;
   filtering the non-scrambled access unit delimiter from the NAL units of the video stream;
   generating positional information of a start of a frame of the video stream based on the non-scrambled access unit delimiter;
   storing the positional information into a database, wherein the non-scrambled access unit delimiter is located in a payload portion of a packet of the video stream; and
   indexing, using the database, frames of the video stream, wherein a scrambling control flag located in a transport stream layer packet of the video stream is used to control scrambling of the payload portion of the packet, wherein the scrambling control flag is set to a value that inhibits or initiates scrambling of the payload portion based on contents in the payload portion.

2. The method of claim 1, wherein the value comprises a first value that inhibits scrambling of the payload portion responsive to the payload portion comprising the non-scrambled access unit delimiter.

3. The method of claim 2, wherein the value comprises a second value that initiates scrambling of the payload portion responsive to the payload portion comprising video data corresponding to a video program.

4. The method of claim 1, wherein the scrambling control flag is located within a header of the transport stream layer packet of the video stream.

5. The method of claim 1, further comprising providing, based on the indexing, personal video recorder (PVR) functionality, wherein the PVR functionality comprises at least one of frame advance, slow motion, smooth fast forward, pause/still, fast forward, slow forward, rewind, slow reverse, or skip functions.

6. A system comprising:
a receiver configured to receive a video stream comprising network abstraction layer (NAL) units;
a filter circuit configured to filter a non-scrambled access unit delimiter from each of the NAL units of the video stream, the non-scrambled access unit delimiter being located within a payload portion of a packet of the video stream; and
a storage device configured to store a database of descriptors, wherein each of the descriptors describes a location of a start of a frame of the video stream based on the non-scrambled access unit delimiter for each of the NAL units, the database being used to index frames of the video stream.

7. The system of claim 6, wherein a scrambling control flag is used to control scrambling of a payload portion of a transport stream layer packet of the video stream.

8. The system of claim 6, wherein a scrambling control flag is used to control scrambling of a payload portion of a packetized elementary stream layer packet of the video stream.

9. The system of claim 8, wherein the scrambling control flag is located within a header of the packetized elementary stream layer packet.

10. The system of claim 8, wherein the scrambling control flag is used to inhibit scrambling of the payload portion when the payload portion comprises the non-scrambled access unit delimiter.

11. The system of claim 6, wherein the video stream comprises non-scrambled packet position, timing, and length of frame information.

12. The system of claim 11, wherein the video stream further comprises picture type.

13. A method of indexing video data within a video stream comprising:
receiving the video stream, the video stream comprising network abstraction layer (NAL) units, each first NAL unit of the NAL units including a non-scrambled access unit delimiter;
filtering the non-scrambled access unit delimiter from each of the NAL units of the video stream, the non-scrambled access unit delimiter being located within a payload portion of a packet of the video stream;
maintaining a database of descriptors describing positional information of a start of a frame of the video stream, wherein the positional information is based on the non-scrambled access unit delimiter for each of the NAL units; and
indexing frames of the video stream based on the database.

14. The method of claim 13, wherein filtering occurs while recording selected data corresponding to at least one of video programs or channels.

15. The method of claim 13, wherein a scrambling control flag is used to control scrambling of a payload portion of a transport stream layer packet of the video stream.

16. The method of claim 15, wherein the scrambling control flag is located within a header of the transport stream layer packet.

17. The method of claim 15, wherein the scrambling control flag is used to inhibit scrambling of the payload portion in response to the payload portion comprising the non-scrambled access unit delimiter.

18. The method of claim 15, wherein the scrambling control flag is used to inhibit scrambling of the payload portion in response to the payload portion comprising video data corresponding to a video program.

19. The method of claim 13, wherein a scrambling control flag is used to control scrambling of a payload portion of a packetized elementary stream layer packet of the video stream.

20. The method of claim 13, further comprising providing, based on the indexing, personal video recorder (PVR) functionality comprising playback modes of the video stream.

* * * * *